(12) United States Patent
Kogan et al.

(10) Patent No.: US 12,260,267 B2
(45) Date of Patent: Mar. 25, 2025

(54) COMPACT NUMA-AWARE LOCKS

(71) Applicant: Oracle International Corporation, Redwood City, CA (US)

(72) Inventors: Alex Kogan, Needham, MA (US); David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 321 days.

(21) Appl. No.: 18/052,890

(22) Filed: Nov. 4, 2022

(65) Prior Publication Data

US 2023/0161641 A1 May 25, 2023

Related U.S. Application Data

(63) Continuation of application No. 17/200,610, filed on Mar. 12, 2021, now Pat. No. 11,494,242, which is a continuation of application No. 16/573,863, filed on Sep. 17, 2019, now Pat. No. 10,949,264.

(60) Provisional application No. 62/734,852, filed on Sep. 21, 2018.

(51) Int. Cl.
*G06F 9/46* (2006.01)
*G06F 9/52* (2006.01)

(52) U.S. Cl.
CPC .......... *G06F 9/52* (2013.01); *G06F 2209/521* (2013.01)

(58) Field of Classification Search
CPC .................................................. G06F 9/52
See application file for complete search history.

(56) References Cited

U.S. PATENT DOCUMENTS

| | | |
|---|---|---|
| 6,965,961 B1 | 11/2005 | Scott |
| 8,458,721 B2 | 6/2013 | Marathe et al. |
| 8,694,706 B2 | 4/2014 | Dice et al. |
| 8,966,491 B2 | 2/2015 | Calciu et al. |
| 10,949,264 B2 | 3/2021 | Kogan et al. |
| 2015/0286586 A1 | 10/2015 | Yadav |
| 2016/0378382 A1 | 12/2016 | Busaba |

(Continued)

OTHER PUBLICATIONS

E.W. Dijkstra, "Solution of a Problem in Concurrent Programming Control", ACM, Communications of the ACM. vol. 8, No. 9, Sep. 1965, p. No. 569.

(Continued)

*Primary Examiner* — Gregory A Kessler
(74) *Attorney, Agent, or Firm* — Robert C. Kowert; Kowert, Hood, Munyon, Rankin & Goetzel, P.C.

(57) ABSTRACT

A computer comprising multiple processors and non-uniform memory implements multiple threads that perform a lock operation using a shared lock structure that includes a pointer to a tail of a first-in-first-out (FIFO) queue of threads waiting to acquire the lock. To acquire the lock, a thread allocates and appends a data structure to the FIFO queue. The lock is released by selecting and notifying a waiting thread to which control is transferred, with the thread selected executing on the same processor socket as the thread controlling the lock. A secondary queue of threads is managed for threads deferred during the selection process and maintained within the data structures of the waiting threads such that no memory is required within the lock structure. If no threads executing on the same processor socket are waiting for the lock, entries in the secondary queue are transferred to the FIFO queue preserving FIFO order.

20 Claims, 9 Drawing Sheets

(56) References Cited

U.S. PATENT DOCUMENTS

2020/0034212 A1    1/2020    Shveidel

OTHER PUBLICATIONS

John M. Mellor-Crummey, et al., "Algorithms for Scalable Synchronization on Shared-Memory Multiprocessors", ACM Trans. on Computer Systems, Jan. 1991, 42 Pages.
Dave Dice, et al., "Flat-Combining NUMA Locks", ACM, SPAA'11, Jun. 4-6, 2011, pp. 65-74.
Milind Chabbi, et al., "High Performance Locks for Multi-level NUMA Systems", ACM, PPoPP'15, Feb. 7-11, 2015, Retrieved from http://dx.doi.org/10.1145/2688500.2688503, pp. 215-226.
David Dice, et al., "Lock Cohorting: A General Technique for Designing NUMA Locks", ACM, PPoPP'12, Feb. 25-29, 2012, 10 Pages.

```
struct cna_node {                200
    uintptr_t spin;              210
    int       ID;                220
    struct cna_node *tail;       230
    struct cna_node *next;       240
};
```

```
struct cna_lock {                250
    struct cna_node *lockTail;   260
};
```

FIG. 2

COMPACT NUMA-AWARE LOCKS

This application is a continuation of U.S. patent application Ser. No. 17/200,610, filed Mar. 12, 2021, which is a continuation of U.S. patent application Ser. No. 16/573,863, filed Sep. 19, 2019, now U.S. Pat. No. 10,949,264, which claims priority to U.S. Provisional Application No. 62/734,852 filed Sep. 21, 2018, which are herein incorporated by reference in their entirety.

BACKGROUND

Field of the Disclosure

This disclosure relates generally to concurrent programming, and more particularly to systems and methods for performing concurrent synchronization using software lock operations in Non-Uniform Memory Access (NUMA) architectures.

Description of the Related Art

Modern computer systems conventionally include the ability to run multiple threads of execution simultaneously, thus giving rise to the need to synchronize threads for access to shared data structures. Among these synchronization mechanisms is the lock operation. When using locks, data shared among multiple threads have an associated lock, and to access the shared data a thread must first obtain the lock, then release the lock once access is complete. Threads which attempt to obtain the lock while it is currently allocated to another thread must wait for the lock to become available.

Modern multi-socket computer architectures exhibit non-uniform memory access (NUMA) behavior, where access by a processor core to data cached locally on a socket is much faster than access to data cached on a remote socket. Existing NUMA-aware lock implementations exploit this behavior by keeping lock ownership on the same socket, thus reducing remote cache misses and inter-socket communication. These implementations, however, are hierarchical in nature, thus requiring memory space proportional to the number of processor sockets. This increased memory requirement renders the NUMA-aware locks unsuitable for systems that are sensitive to memory requirements of their synchronization constructs. Thus, a NUMA-aware lock implementation that does not increase memory requirements for synchronization constructs may result in improved performance in these sensitive computing environments.

SUMMARY

Methods, techniques and systems for providing compact, efficient locks are described. These various embodiments provide NUMA-aware locking semantics while only requiring a single word of memory per lock. While similar to existing locking approaches such as the Mellor-Crummey and Scott, or MCS, lock and possessing similar benefits such as local spinning and a single atomic instruction in the acquisition path, these locking embodiments organize waiting threads in two queues, one composed of threads running on the same processor socket as the current lock holder and another composed of threads running on a different socket(s). This enables single-threaded performance comparable to existing locking implementations, such as MCS, while significantly outperforming those implementations under high lock contention, thus achieving the same or better performance without memory growth encountered in traditional NUMA-aware locks.

BRIEF DESCRIPTION OF THE DRAWINGS

FIG. 2 is a diagram illustrating the lock and node data structures used in various embodiments.

Figure 1:
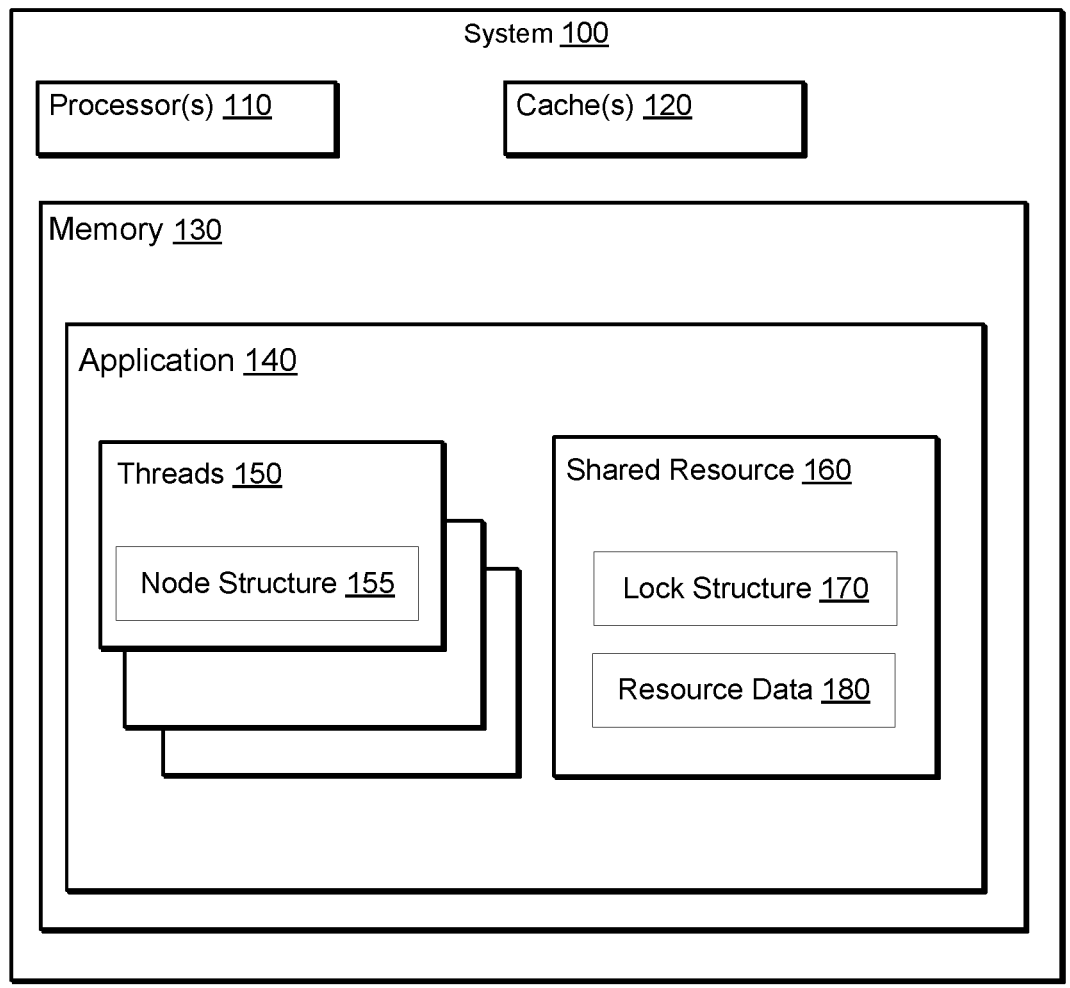
FIG. 1 is a block diagram illustrating a system implementing an application execution environment including multiple threads sharing a resource through the use of a NUMA-aware lock.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Locks are used by concurrently running processes (or threads) to acquire exclusive access to shared data. Studies have shown that the performance of such software quite often depends directly on the efficiency of the locks it employs and the evolution of lock implementations is tightly coupled with the evolution of computing architectures. Modern architectures feature an increasing number of CPU nodes (or sockets), each including locally attached memory, a fast local cache and multiple processing units (or cores). Accesses by a core to a local memory or local cache may be significantly faster than accesses to the remote memory or cache lines residing on another node, a characteristic known as NUMA, or Non-Uniform Memory Access. As a result, software methods may be broadly categorized as either NUMA-aware methods that are adapted to these characteristics or NUMA-oblivious methods that are unaware of NUMA performance issues.

NUMA-aware locking methods have been developed which prefer lock ownership to remain within the same socket. This NUMA-aware locking approach decreases remote cache misses and associated inter-socket traffic as it increases the chance that the lock data, as well as the subsequently accessed shared data, will be cached locally to the socket on which a lock holder is running.

While NUMA-aware locks may offer performance benefits over other locking approaches, characteristics of these locks hamper adoption. While existing NUMA-oblivious lock implementations may require only a single memory word per locking context, NUMA-aware locks are hierarchical in nature, thus requiring a thread to acquire multiple low-level locks before it can enter a critical section and consume memory space proportional to the number of processor sockets. These requirements reduce performance in low-contention or no contention locking applications and preclude their use in certain environments sensitive to memory use.

Various embodiments of the present invention implement compact NUMA-aware locking requiring the acquisition of only a single lock and the performance of only a single atomic operation per lock acquisition while requiring only a single word of memory per locking context. Thus, the present lock implementations mitigate the performance disadvantages of existing NUMA-aware locks while enabling their use in memory-sensitive applications.

FIG. 1 is a block diagram illustrating a system implementing an application execution environment including multiple threads sharing a resource through the use of a NUMA-aware lock. The System 100 includes one or more Processors 110 capable of executing multiple parallel threads of execution coupled through one or more Caches 120 to a Memory 130 that includes an Application 140. The Application 140 may include multiple executing Threads 150 that access a Shared Resource 160. Each of the Threads 150 includes a Node Structure 155 as illustrated in FIG. 2. The Shared Resource 160 includes a controlling Lock Structure 170, as illustrated in FIG. 2, and Resource Data 180 sharable by the Threads 150. To access Resource Data 180 of the Shared Resource 160, one of the Threads 150 must first allocate the Shared Resource 160 using the Lock Structure 170. Once the Shared Resource 160 is allocated, the Thread 150 may access the Resource Data 180 and when the Thread no longer requires access to the Shared Resource 160, the Thread 150 may release the Shared Resource 160 using the Lock Structure 170. While FIG. 1 shows a single application with three executing threads and one shared resource, this example is not intended to be limiting and any number of applications with any number of threads sharing any number of resources may be envisioned.

Threads which desire to allocate the lock add a representative data structure onto a First-In-First-Out (FIFO) queue. A second queue is managed by the locking operation that contains data structures for threads that have been deferred for later allocation. The thread-specific data structure and the lock data structure are shown in FIG. 2. The lock data structure, cna_lock 250, consists of a single field, lockTail 260, containing a pointer to the last thread data structure enqueued in the FIFO queue for allocation of the lock and is initialized to zero, or a NULL value, indicating that the lock is not allocated nor are any threads waiting to acquire the lock. The thread-specific data structure, cna_node 200, includes a spin field 210, an ID field 220, a optional tail field 230 and a next field 240. The next field 240, in combination with the lockTail field 260, implement the FIFO queue for the lock. The spin field 210 provides thread-specific local memory to signal the thread when the lock has been acquired. In addition, the spin field of the thread controlling the lock may also contain a pointer to the head of the secondary queue containing deferred waiting thread data structures. The ID field 220 may contain a value identifying the processor executing the thread, and the tail field 230, if used, may contain a pointer to the last entry in the secondary queue, should the secondary queue contain elements. In some embodiments, the tail field 230 may be omitted in order to minimize memory usage of the cna_node structure 200. In these embodiments, other methods for identifying the last entry in the secondary queue may be employed. For example, the last entry may be identified by scanning the secondary queue for an element whose next field 240 contains a 0 or NULL value. Additionally, other methods may be employed and it should be understood that the conventions described above are not intended to be limiting.

Figure 3:
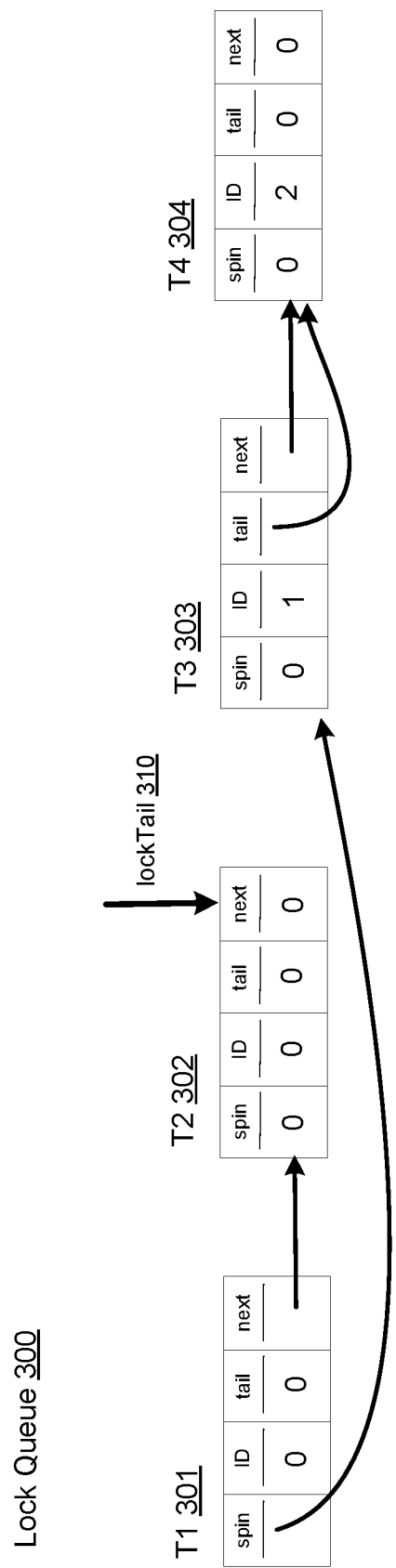
FIG. 3 is a diagram illustrating one embodiment of a lock queue comprising main and secondary lock queues.

FIG. 3 illustrates an example state of a lock queue containing four waiting threads, T1 301, T2 302, T3 303 and T4 304. These four threads execute on three different sockets, T1 301 and T2 302 executing on socket ID 0 as identified by their respective ID fields 220, T3 303 executing on socket ID 1 as identified by its respective ID field 220, and T4 304 executing on socket ID 2 as identified by its respective ID field 220. Thread T1 301 currently controls the lock, as indicated by a non-zero value in its respective spin field 210. The first waiting thread in the FIFO queue is T2 302 as indicated by the next field 240 of T1 301 containing a pointer to T2 302. Furthermore, T2 302 is the last waiting thread in the FIFO as indicated by the lockTail field 260 containing the address of T2 302. Additionally, the two remaining waiting threads, T3 303 and T4 304, are represented in a secondary queue as they have been deferred for executing on a socket other than the socket executing T1 301. The existence of this secondary queue is indicated by the spin field 210 of T1 301 containing a pointer to the data structure representing T3 303. In addition, the tail field 230 of T3 303 contains a pointer to the data structure of T4 304, enabling rapid access to the last element in the secondary queue.

The spin field 210 of cna_node 200 may contain one of three possible states, a wait state indicating that the lock has not yet been acquired, an active state indicating that the lock has been acquired but that no secondary queue exists, and a pointer state indicating that the lock has been acquired and that a secondary queue exists. In the case of a pointer state, the spin value contains a pointer to the head of the secondary queue. Different implementations of the spin field 210 may be envisioned in various embodiments. For example, in a preferred embodiment, a wait state may be indicated with a value of zero and an active state indicated with a value of one. In many modern computer architectures, neither a value of zero or one is a valid pointer address as a zero value indicates a NULL pointer and even byte alignments of multi-element data structures such as the cna_node structure 200 are easily ensured. Thus, a single pointer field may contain all three required states without restriction on the range of memory addresses allowable for cna_node data structures. Other encodings of the spin field 210 may also be employed and it should be understood that the conventions described above are not intended to be limiting.

The ID field 220 of cna_node 200 may contain a value indicating a processor, or processor complex or socket, for which an affinity to transfer control of the lock may be desired. Examples would include individual processor cores or individual processor sockets of a multi-socket system where multiple cores within the same socket share similar access to memory and cache. In some embodiments, this information may be obtained through a system call while in other embodiments it may be obtained by directly executing one or more CPU instructions. Other means of obtaining values for the ID field 220 may also be employed and it should be understood that the techniques described above are not intended to be limiting.

Figure 4:
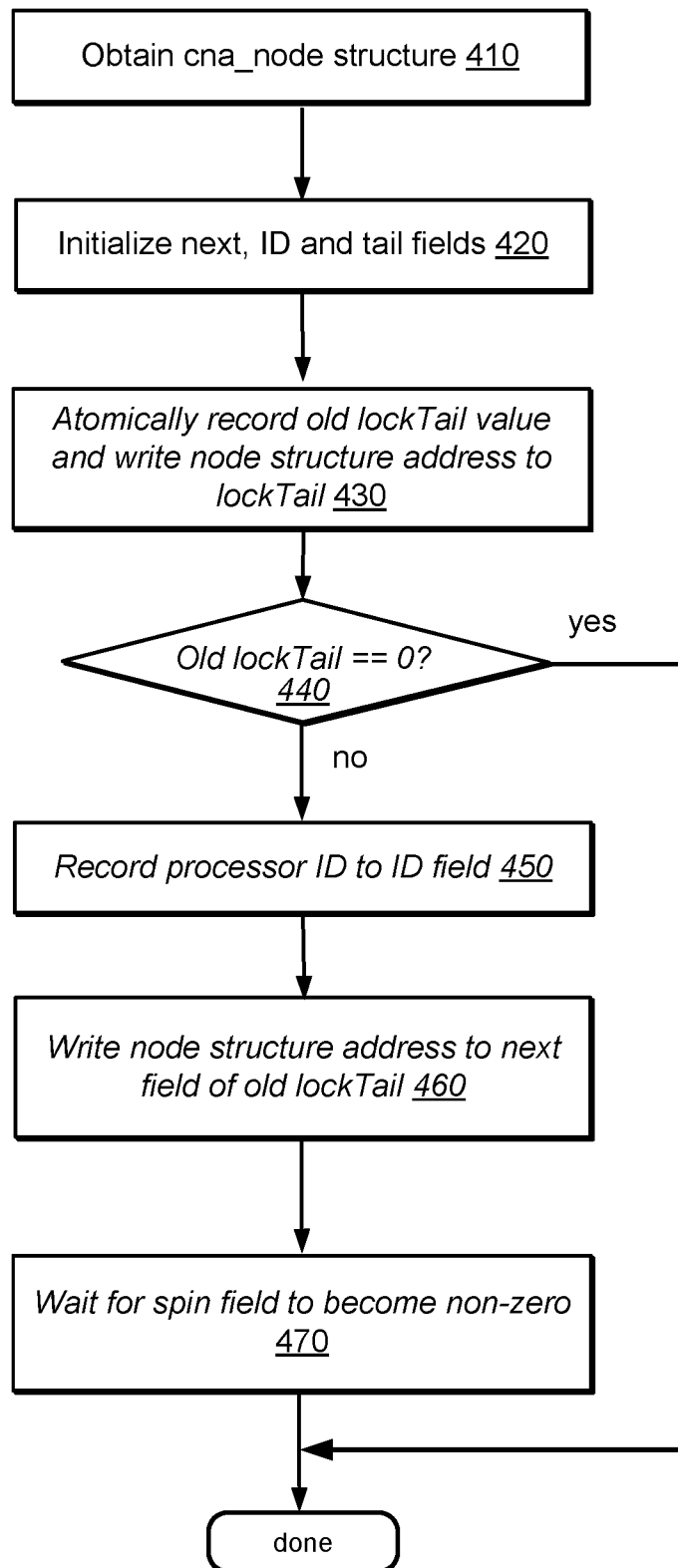
FIG. 4 is a flow diagram illustrating one embodiment of a method for requesting allocation of a lock.

FIG. 4 is a flow diagram illustrating a method for a thread requesting allocation of a lock according to some embodiments. The method begins with the thread allocating a cna_node data structure 200 as shown in step 410. This allocation may be performed in a variety of ways. In one embodiment, the structure may be statically allocated as part the thread context and instantiated when the thread is created. In another embodiment, the structure may be allocated on the application heap either implicitly through object construction or explicitly through dynamic memory allocation. In still another embodiment, the structure may be automatically allocated on the thread stack either through memory allocation or entry to a function or subroutine. Regardless of memory allocation mechanism, the memory must remain allocated until the lock has been allocated and subsequently released by the thread or until the locking mechanism has otherwise exited. It should be understood that any of a variety of memory allocation techniques may be employed and that the memory allocation techniques described above are not intended to be limiting.

Next, the thread initializes the next 240 and tail 230 fields of the data structure to 0 and initializes the ID field 220 to an invalid socket ID, such as −1. By initializing the ID field 220 in this manner, latency for low-contention or no-contention operation may be reduced should the determination of socket ID, as discussed above, be costly. Alternatively, the ID field 220 may be initialized to the proper socket ID value should the operation impose modest execution cost.

Next, the thread atomically records the existing value of the lockTail field 260 of the cna_lock structure 250 and writes the address of its allocated data structure to the lockTail field 260. In some embodiments this may be performed by an atomic swap instruction commonly available in modern processor architectures while in other embodiments it may be performed using a sequence of instructions executed indivisibly. It should be understood that a variety of techniques may be employed to perform this sequence of operations atomically and that the atomic swap instruction described above is not intended to be limiting.

Next, the lockTail value recorded in step 430 is compared with 0 in step 440. If the previous lockTail value is 0, then it is indicated that no elements previously existing on the FIFO queue and the lock is therefore unallocated. In this case, the lock allocation request is complete and the thread has successfully acquired the lock. If, however, the lockTail value recorded in step 430 is not 0, execution proceeds to step 450.

Next, the thread records the processor ID in the ID field 230 in step 450 as described above. Once the ID field is recorded, execution proceeds to step 460 where the thread links the data structure into the FIFO queue that was previously determined to exist in step 440. The address of the data structure is written into the next field 240 of the data structure identified by the lockTail value recorded in step 430. Execution proceeds to step 470 where the thread waits for the spin field 210 to indicate that the thread has acquired the lock.

Figure 5:
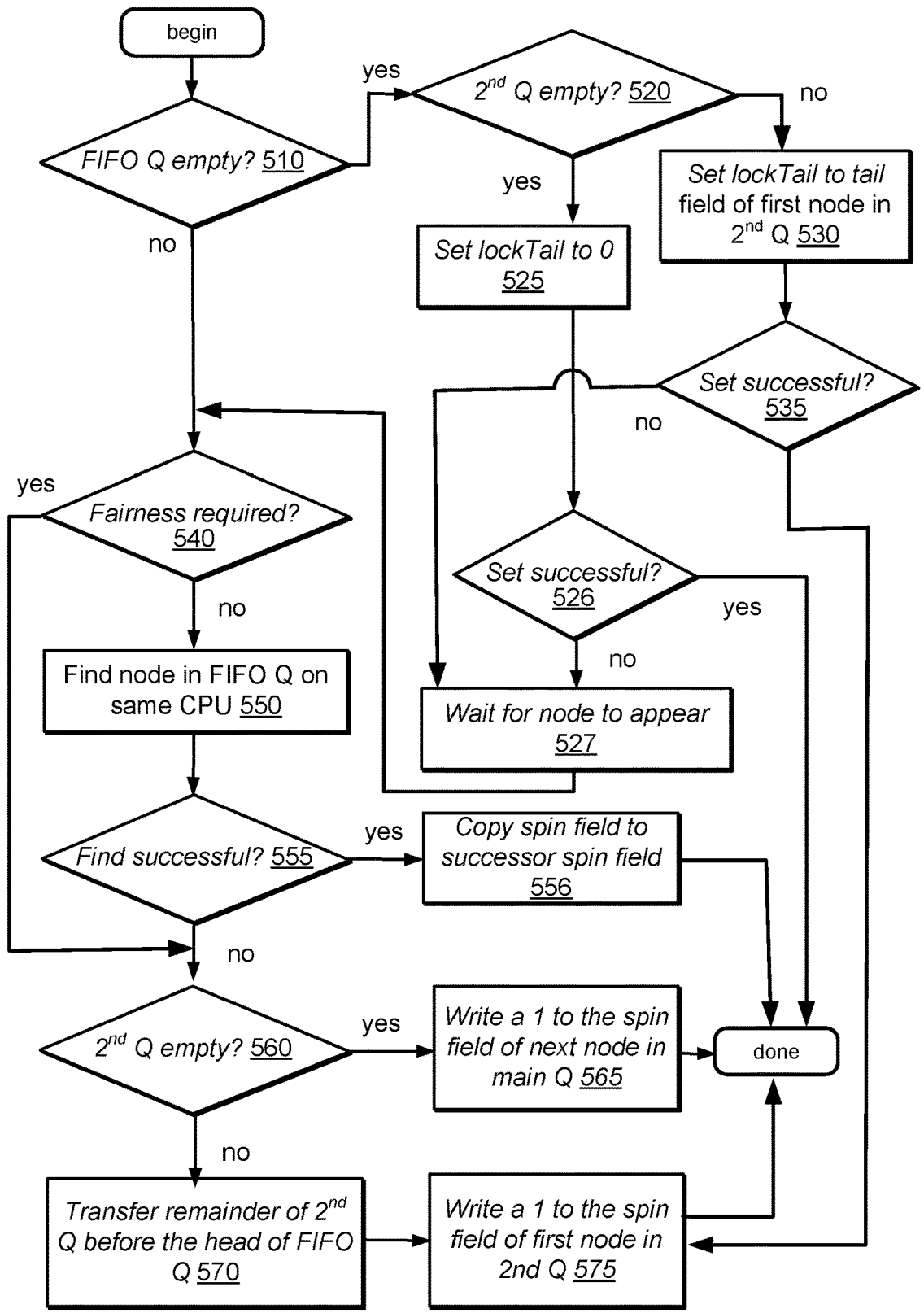
FIG. 5 is a flow diagram illustrating one embodiment of a method for releasing a lock currently held by a thread.

Once a thread has acquired the lock, the thread may perform any application-specific operations for which the lock provides synchronized access. Upon completion of these operations, the thread releases ownership of the lock. FIG. 5 is a flow diagram illustrating a method for releasing a lock currently held by a thread according to some embodiments. Upon entry to the method, the thread first determines if any threads waiting for the lock exist in the FIFO queue in step 510. If no such threads exist, execution proceeds to step 520 where the secondary queue is checked for waiting threads. If, however, waiting threads exist in the FIFO queue, execution proceeds to step 540.

If no threads exist in the FIFO queue, the thread determines if waiting threads exist in the secondary queue in step 520. This is indicated by a pointer state stored in the spin field 210 of the thread, as discussed above. If waiting threads exist in the secondary queue, the secondary queue is transferred to the FIFO queue by setting the lockTail to the tail value 240 of the first waiting thread identified by the pointer state of the spin field 210 of the thread in step 530. Two situations may occur, the current value of lockTail 260 may point to the data structure of the thread or it may point to another data structure indicating that another thread is in the process of adding itself to the FIFO queue for allocation of the lock. For this reason, an atomic compare-and-swap (CAS) instruction is used. This instruction is commonly available in modern computer architectures. The CAS instruction replaces the contents of a memory operation with a new value if and only if the existing contents of the memory location match a provided third value. If the current contents of the lockTail field 260 contain a pointer to the data structure of the thread, the lockTail field 260 is written with a pointer to the data structure of the last waiting thread in the secondary queue and the operation proceeds to step 575 through decision step 535. If, however, the current contents of the lockTail field 260 does not contain a pointer to the data structure of the thread, the CAS instruction fails indicating that another thread is in the process of enqueuing into the FIFO queue. In this event, the thread waits for the waiting thread to appear in the FIFO queue in step 527 by wait for its next field 240 to contain a non-zero value. Once this occurs, execution proceeds to step 540.

If, however, no threads exist in the secondary queue then the lock may become free. In this case, execution proceeds to step 525 where the thread attempts to set lockTail 260 to 0 indicating that the lock is free. Two situations may occur, the current value of lockTail 260 may point to the data structure of the thread or it may point to another data structure indicating that another thread is in the process of adding itself to the FIFO queue for allocation of the lock. For this reason, an atomic compare-and-swap (CAS) instruction is again used. If the current contents of the lockTail field 260 contain a pointer to the data structure of the thread, the lockTail field 260 is written with a value of 0 and the operation is complete. If, however, the current contents of the lockTail field 260 does not contain a pointer to the data structure of the thread, the CAS instruction fails indicating that another thread is in the process of enqueuing into the FIFO queue. In this event, the thread waits for the waiting thread to appear in the FIFO queue in step 527 by wait for its next field 240 to contain a non-zero value. Once this occurs, execution proceeds to step 540.

Once execution proceeds to step 540, at least one waiting thread exists in the FIFO queue. First, the thread determines if a switch to another processor ID is required to ensure desirable fairness. This determination may be made in a number of ways. In one embodiment, a count of the number of waiting threads deferred may be maintained. If the number of deferred threads exceeds a threshold, a fairness requirement is determined and execution proceeds to step 560. It should be understood, however, that any of a variety of techniques may be employed to determine that fairness may be required and that method described above is not intended to be limiting.

If fairness is not required, execution proceeds to step 550 where a successor thread is identified which executes on the same socket as the thread. This process is detailed in FIG. 6 as described below. If a successor thread is found as determined in step 555, execution proceeds to step 556 where the spin field 210 of the thread is copied to the spin field 210 of the successor thread's data structure. At this point, ownership of the lock has been transferred to the successor thread and the operation is complete.

If, however, a successor thread is not found, then a processor switch must occur. First, the thread determines if threads exist in the secondary queue in step 560, as these threads must take priority over threads remaining in the FIFO queue. If no such threads exist, execution proceeds to step 565 where the spin value 210 of the next node in the FIFO queue is written with a value of 1. At this point, ownership of the lock has been transferred and the operation is complete.

If, however, threads exist in the secondary queue, the threads remaining in the FIFO queue are transferred to the tail of the secondary queue in step 570 and the first node in the secondary queue is written with a value of 1 in step 575. At this point, ownership of the lock has been transferred and the operation is complete.

Figure 6:
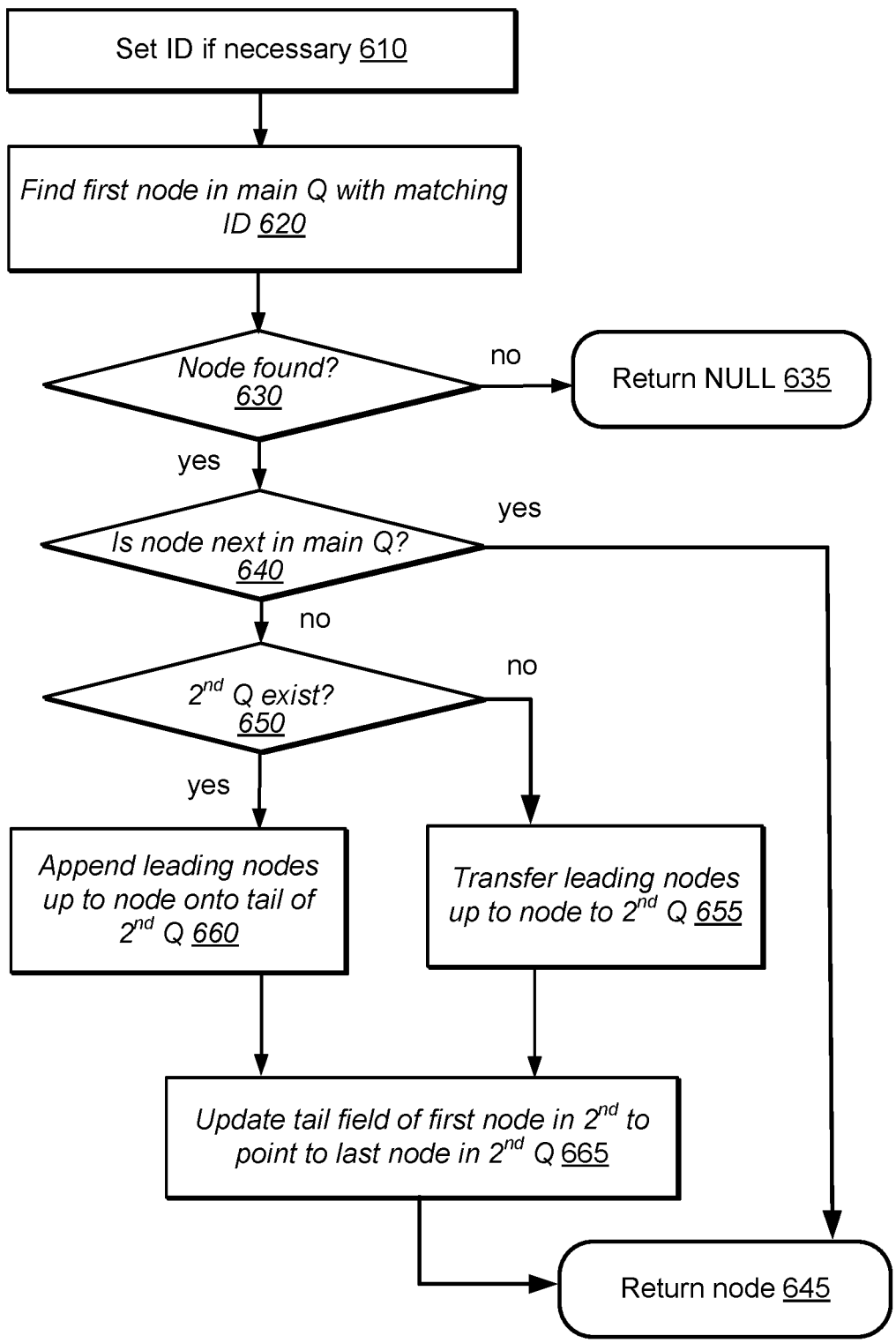
FIG. 6 is a flow diagram illustrating one embodiment of a method for identifying the next waiting thread to assume control of a lock.

FIG. 6 is a flow diagram illustrating one embodiment of a method for identifying a successor thread waiting to assume control of a lock and executing on the same socket as the current thread. First, in step 620 the current thread checks the ID field 220 of its associated data structure 200 and sets the ID field if the current ID is unknown. Next, the thread scans the FIFO queue to find the first occurrence of a waiting thread which executes on the same socket. If no such waiting thread is found in step 630, the method returns a NULL value indicating that no successor was found in step 635. If a thread is found, a determination is made whether the thread is the first waiting thread in the FIFO queue in step 640. If the thread is the first waiting thread in the FIFO queue, the data structure for that thread is returned as the successor thread in step 645. If, however, the thread is not the first waiting thread, then one or more threads executing on a different socket must be deferred by transferring their respective data structures to the secondary queue. If the secondary queue exists, as determined in step 650, the threads to be deferred are appended to the tail of the existing secondary queue in step 660. Otherwise, a secondary queue is created by transferring the threads to be deferred into the secondary queue in step 655 and updating the spin field 210 to a pointer state indicating the existence of a secondary queue. Once the one or more threads are deferred to the secondary queue, the tail field 230 of the first entry of the secondary queue is updated to point to the last entry in the secondary queue in step 665. Upon completion of this update, the successor node identified in step 620 is returned in step 645.

Figure 7A:
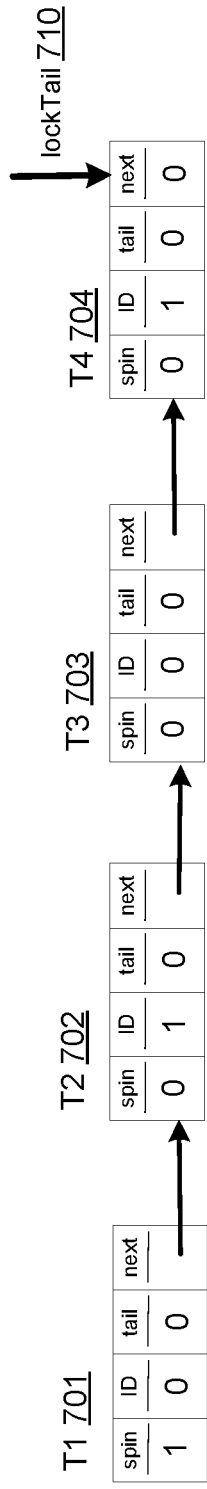
FIG. 7A-F are diagrams illustrating the progression of various states of a lock queue according to some embodiments.

FIG. 7A is a diagram illustrating an example initial queue state of a NUMA-aware locking operation according to some embodiments. The lock queue of FIG. 7A includes a FIFO queue containing four waiting threads, T1 701, T2 702, T3 703 and T4 704 and no secondary queue. These four threads execute on two different sockets, T1 701 and T2 702 executing on socket ID 0 as identified by their respective ID fields 220, and T3 703 and T4 704 executing on socket ID 1 as identified by its respective ID field 220. Thread T1 701 currently controls the lock, as indicated by a non-zero value in its respective spin field 210. The first waiting thread in the FIFO queue is T2 702 as indicated by the next field 240 of T1 701 containing a pointer to T2 702. The second waiting thread in the FIFO queue is T3 703 as indicated by the next field 240 of T2 702 containing a pointer to T3 703. The third and final waiting thread in the FIFO queue is T4 704 as indicated by the next field 240 of T3 703 containing a pointer to T4 704. As T4 704 is the final waiting thread, the lockTail field 710 of the cna_lock structure 250 contains a pointer to T4 704. Furthermore, the tail fields 230 of all threads in the lock queue have been initialized to 0.

Figure 7B:
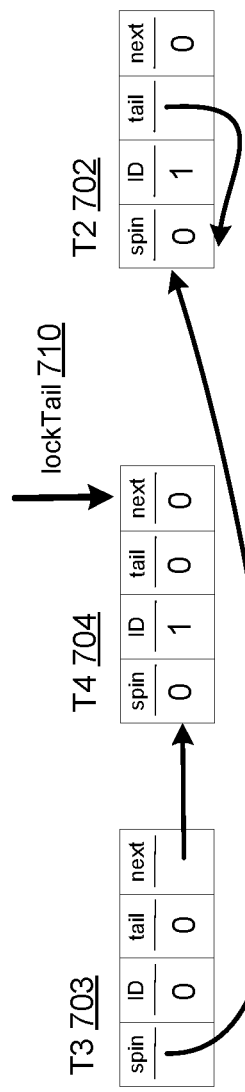

FIG. 7B is a diagram illustrating a later state of the lock queue shown in FIG. 7A according to some embodiments. The controlling thread T1 701 completed execution of the critical section requiring the lock and released the lock according to the method described in FIG. 5 above. Thread T1 701 identified thread T3 703 as the first waiting thread in the FIFO queue executing on the same processor as T1, thus determining that thread T2 702 must be deferred for later allocation. T2 has therefore been transferred to a secondary queue. Thread T3 703 currently controls the lock, as indicated by a non-zero value in its respective spin field 210. Furthermore, the spin field 210 of thread T3 703 contains a pointer state indicating the existence of a secondary queue for which thread T2 702 is the first and only element. The first and only waiting thread in the FIFO queue is T4 704 as indicated by the next field 240 of T3 703 containing a pointer to T4 704. As T4 704 is the final waiting thread, the lockTail field 710 of the cna_lock structure 250 contains pointer to T4 704. Finally, as thread T2 702 is the only element in the secondary queue, the tail field 230 of thread T2 702 contains a pointer to thread T2 702.

Figure 7C:
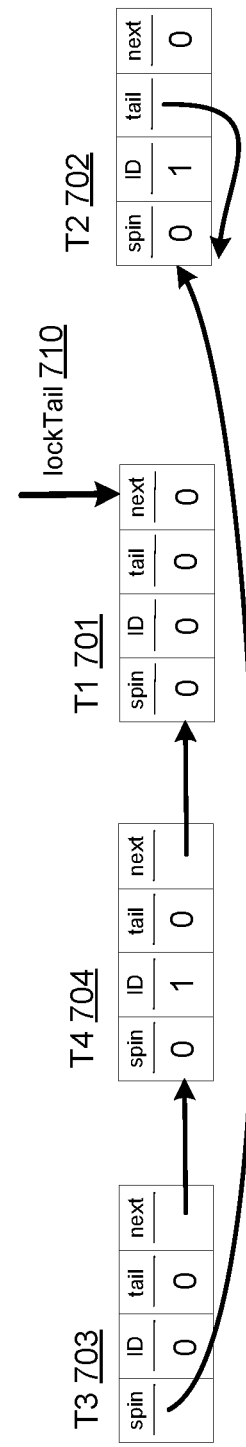

FIG. 7C is a diagram illustrating a later state of the lock queue shown in FIG. 7B according to some embodiments. Thread T1 701 desires to allocate the lock and has been enqueued in the lock queue according to the method described in FIG. 4 above. Thread T3 703 currently controls the lock, as indicated by a non-zero value in its respective spin field 210. Furthermore, the spin field 210 of thread T3 703 contains a pointer state indicating the existence of a secondary queue for which thread T2 702 is the first and only element. The first waiting thread in the FIFO queue is T4

704 as indicated by the next field 240 of T3 703 containing a pointer to T4 704. The second and final waiting thread in the FIFO queue is T1 701 as indicated by the next field 240 of T4 704 containing a pointer to T1 701. As T1 701 is the final waiting thread, the lockTail field 710 of the cna_lock structure 250 contains a pointer to T1 701. Finally, as thread T2 702 is the only element in the secondary queue, the tail field 230 of thread T2 702 contains a pointer to thread T2 702.

Figure 7D:
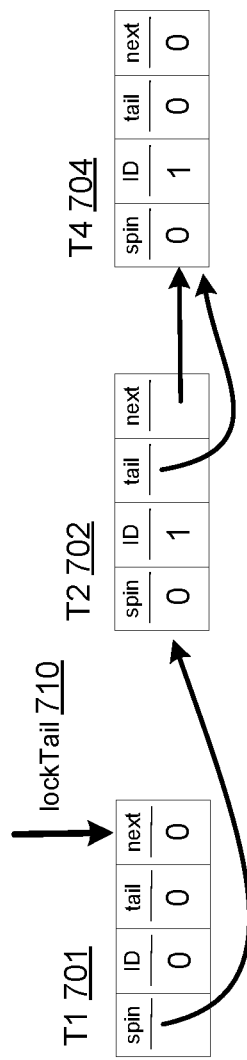

FIG. 7D is a diagram illustrating a later state of the lock queue shown in FIG. 7C according to some embodiments. The controlling thread T3 703 completed execution of the critical section requiring the lock and released the lock according to the method described in FIG. 5 above. Thread T3 703 identified thread T1 701 as the first waiting thread in the FIFO queue executing on the same processor as T3, thus determining that thread T4 704 must be deferred for later allocation. T4 has therefore been transferred to a secondary queue. Thread T1 701 currently controls the lock, as indicated by a non-zero value in its respective spin field 210. Furthermore, the spin field 210 of thread T1 701 contains a pointer state indicating the existence of a secondary queue for which thread T2 702 is the first element. As no other waiting threads exist in the FIFO queue, the lockTail field 710 of the cna_lock structure 250 contains a pointer to T1 701. Finally, as the secondary queue now has threads T2 702 and T4 704, the next field 240 and the tail field 230 of thread T2 702 both contain a pointer to thread T4 704.

Figure 7E:
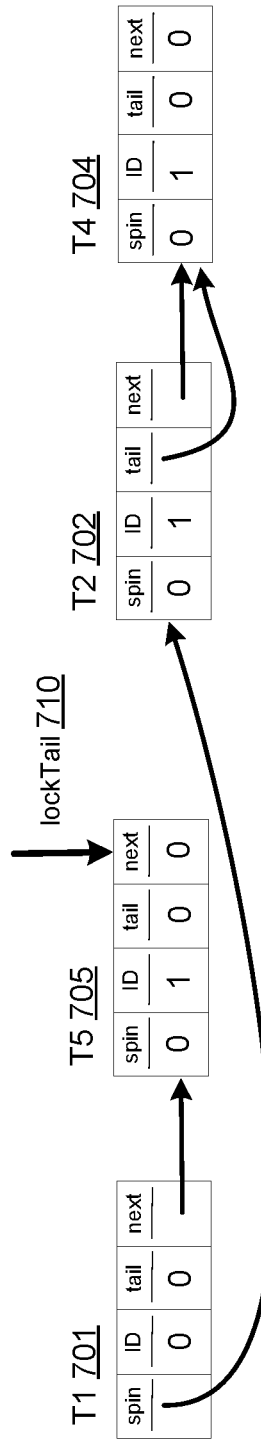

FIG. 7E is a diagram illustrating a later state of the lock queue shown in FIG. 7D according to some embodiments. A new thread T5 705 desires to allocate the lock and has been enqueued in the lock queue according to the method described in FIG. 4 above. Thread T5 executes on socket ID 1 as identified by its respective ID field 220. Thread T1 701 currently controls the lock, as indicated by a non-zero value in its respective spin field 210. Furthermore, the spin field 210 of thread T1 701 contains a pointer state indicating the existence of a secondary queue for which thread T2 702 is the first element. The first and only waiting thread in the FIFO queue is T5 705 as indicated by the next field 240 of T1 701 containing a pointer to T5 705. As T5 705 is the final waiting thread, the lockTail field 710 of the cna_lock structure 250 contains a pointer to T5 705. Finally, as the secondary queue has threads T2 702 and T4 704, the next field 240 and the tail field 230 of thread T2 702 both contain a pointer to thread T4 704.

Figure 7F:
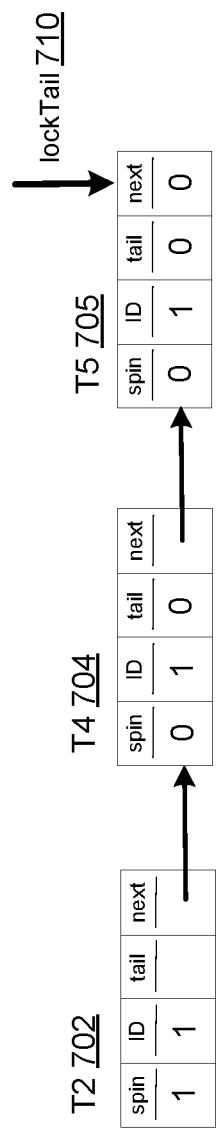

FIG. 7F is a diagram illustrating a later state of the lock queue shown in FIG. 7E according to some embodiments. The controlling thread T1 701 completed execution of the critical section requiring the lock and released the lock according to the method described in FIG. 5 above. Thread T1 701 identified no waiting thread in the FIFO queue executing on the same processor as T1, thus determining that control of the lock will be transferred to a thread executing on another socket. Thread T1 701 therefore appended the remainder of the FIFO to the tail end of the secondary queue, thus consolidating the queues and preserving the original FIFO order of the deferred threads, then thread T1 701 transferred control of the lock to thread T2 702. T2 702 currently controls the lock, as indicated by a non-zero value in its respective spin field 210. Furthermore, the spin field 210 of thread T1 701 contains an active state indicating that no secondary queue exists. The first waiting thread in the FIFO queue is T4 704 as indicated by the next field 240 of T2 702 containing a pointer to T4 704. The second and final waiting thread in the FIFO queue is T5 705 as indicated by the next field 240 of T4 704 containing a pointer to T5 705. As T5 705 is the final waiting thread, the lockTail field 710 of the cna_lock structure 250 contains a pointer to T5 705. Furthermore, the tail fields 230 of all threads in the lock queue have been initialized to 0.

Some of the mechanisms described herein may be provided as a computer program product, or software, that may include a non-transitory, computer-readable storage medium having stored thereon instructions which may be used to program a computer system 400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Figure 8:
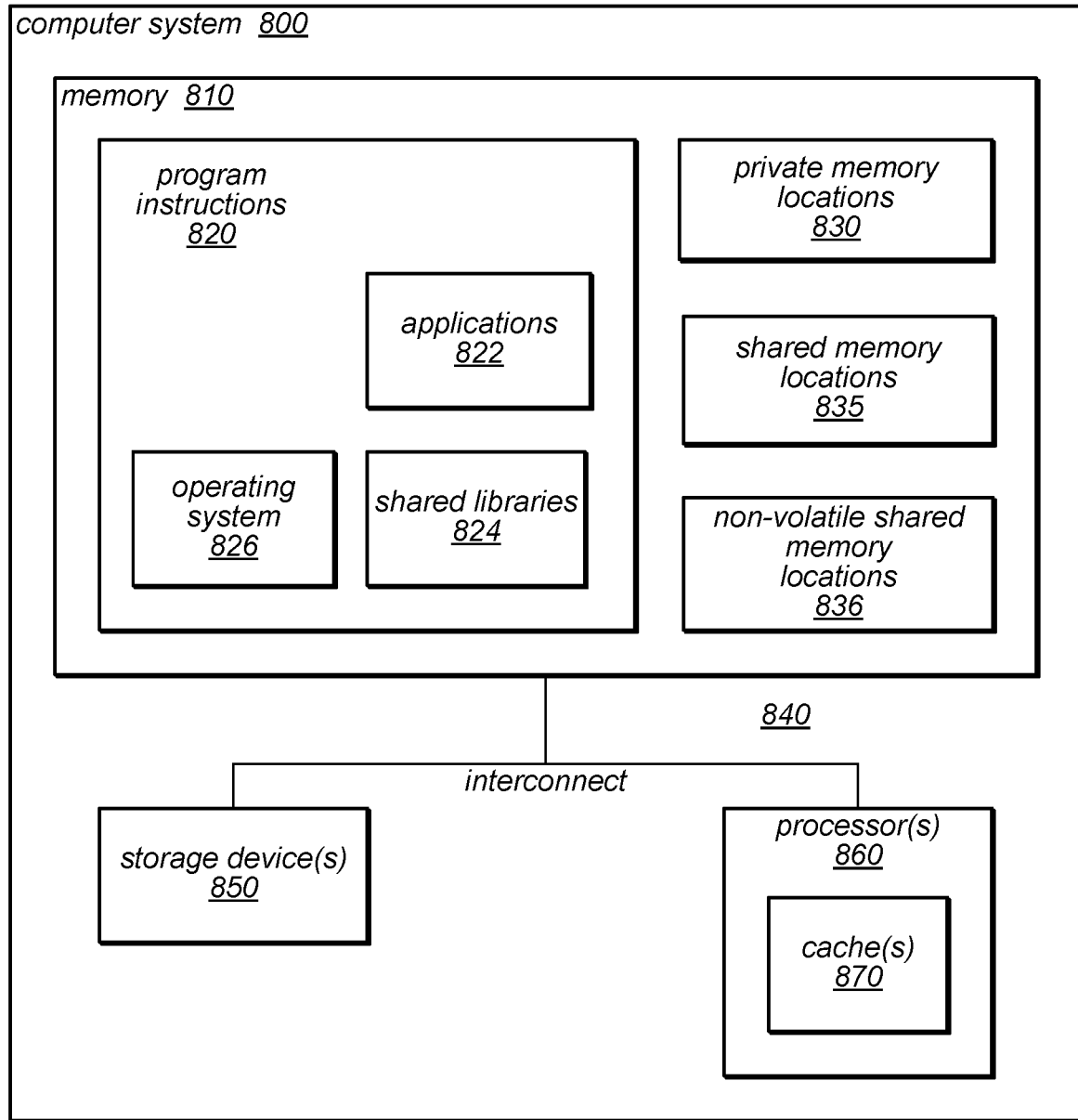
FIG. 8 is a block diagram illustrating one embodiment of a computing system that is configured to implement NUMA-aware lock operations, as described herein.

In various embodiments, computer system 800 may include one or more processors 860; each may include multiple cores, any of which may be single- or multi-threaded. For example, multiple processor cores may be included in a single processor chip (e.g., a single processor 860), and multiple processor chips may be included in computer system 800. Each of the processors 860 may include a cache or a hierarchy of caches 870, in various embodiments. For example, each processor chip 860 may include multiple L1 caches (e.g., one per processor core) and one or more other caches (which may be shared by the processor cores on a single processor). The computer system 800 may also include one or more storage devices 850 (e.g. optical storage, magnetic storage, hard drive, tape drive, solid state memory, etc.) and one or more system memories 810 (e.g., one or more of cache, SRAM, DRAM, RDRAM, EDO RAM, DDR RAM, SDRAM, Rambus RAM, EEPROM, etc.). In some embodiments, one or more of the storage device(s) 450 may be implemented as a module on a memory bus (e.g., on interconnect 840) that is similar in form and/or function to a single in-line memory module (SIMM) or to a dual in-line memory module (DIMM). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 860, the storage device(s) 850, and the system memory 810 may be coupled to the system interconnect 840. One or more of the system memories 810 may contain application data 828 and program instructions 820. Application data 828 may contain various data structures to implement enhanced ticket locks while Program instructions 820 may be executable to implement one or more applications 822, shared libraries 824, and/or operating systems 826.

Program instructions 820 may be encoded in platform native binary, any interpreted language such as Java™ byte-code, or in any other language such as C/C++, the Java™ programming language, etc., or in any combination thereof. In various embodiments, applications 822, operating system 826, and/or shared libraries 824 may each be implemented in any of various programming languages or methods. For example, in one embodiment, operating system 826 may be based on the Java programming language, while in other embodiments it may be written using the C or C++ programming languages. Similarly, applications 822 may be written using the Java programming language, C, C++, or another programming language, according to various embodiments. Moreover, in some embodiments, applications 822, operating system 826, and/shared libraries 824 may not be implemented using the same programming language. For example, applications 822 may be C++ based, while shared libraries 824 may be developed using C.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein. It is intended that the following claims be interpreted to embrace all such variations and modifications.

In conclusion, embodiments of a compact NUMA-aware lock are disclosed. These embodiments require only a single word of memory per lock and are therefore useful to provide NUMA-aware locking semantics in applications that are sensitive to memory grown in locking contexts. While similar to existing locking approaches such as the MCS lock and possessing similar benefits, these locking embodiments additionally organize waiting threads in two queues, one composed of threads running on the same processor socket as the current lock holder and another composed of threads running on a different processor socket(s). This enables single-threaded performance comparable to existing locking implementations, such as MCS, while significantly outperforming those implementations under high lock contention, thus achieving the same or better performance without memory growth encountered in traditional NUMA-aware locks.

What is claimed:

1. A method of transferring control of a lock, comprising:
performing by a first controlling thread:
adding, by a first thread, a wait structure to a primary queue to wait for allocation of a lock, the wait structure comprising a wait field initialized to a zero value; and
writing, by a second thread, a non-zero value to the wait field of the wait structure to transfer control of the lock to the first thread, the non-zero value comprising an address of a secondary queue comprising one or more other threads waiting for the lock.

2. The method of claim 1, further comprising:
moving, prior to writing the non-zero value to the wait field of the wait structure, respective wait structures of one or more other threads linked in front of the wait structure in the primary queue to a secondary queue.

3. The method of claim 2, wherein the first thread executes on one of a plurality of processors of a computing system also executing the second thread, and wherein the one or more other threads execute on another one of the plurality of processors with different memory access characteristics than the processor executing the first controlling thread, and wherein the respective wait structures of the one or more other threads are linked together to form the secondary queue.

4. The method of claim 2, wherein the one or more other threads are moved to the secondary queue preserving the order in which they were enqueued in the primary queue.

5. The method of claim 2, further comprising:
determining, by the first thread after gaining control of the lock, to transfer control of the lock to one of the waiting threads, and responsive to the determining:
moving the respective wait structures of the one or more other threads from the secondary queue to the primary queue; and
writing to a respective wait structure of the one of the other threads to transfer control of the lock to the one of the waiting threads and promote the one of the waiting threads to a third controlling thread.

6. The method of claim 5, wherein the first thread and the second thread execute on one of a plurality of processors of a computing system, wherein the one or more other threads execute on another one of the plurality of processors with different memory access characteristics than the processor executing the first controlling thread and the second controlling thread, and wherein moving the respective wait structures of the one or more threads from the secondary queue to the primary queue is performed responsive to determining that no other thread executes on the one of a plurality of processors executing the second thread.

7. The method of claim 5, wherein moving the respective wait structures of the one or more other threads from the secondary queue to the primary queue comprises inserting the respective wait structures of the one or more other threads at the head of the primary queue to ensure fairness, wherein the respective wait structures of the one or more other threads are linked together preserving the order in which they were enqueued in the primary queue.

8. One or more non-transitory computer-accessible storage media storing program instructions that when executed on or across a plurality of processors cause the plurality of processors to perform:
performing by a first controlling thread:
adding, by a first thread, a wait structure to a primary queue to wait for allocation of a lock, the wait structure comprising a wait field initialized to a zero value; and
writing, by a second thread, a non-zero value to the wait field of the wait structure to transfer control of the lock to the first thread, the non-zero value comprising an address of a secondary queue comprising one or more other threads waiting for the lock.

9. The one or more non-transitory computer-accessible storage media of claim 8, the program instructions that when executed on or across the plurality of processors cause the plurality of processors to further perform:
moving, prior to writing the non-zero value to the wait field of the wait structure, respective wait structures of one or more other threads linked in front of the wait structure in the primary queue to a secondary queue.

10. The one or more non-transitory computer-accessible storage media of claim 9, wherein the first thread executes on one of a plurality of processors of a computing system also executing the second thread, and wherein the one or more other threads execute on another one of the plurality of processors with different memory access characteristics than the processor executing the first controlling thread, and wherein the respective wait structures of the one or more other threads are linked together to form the secondary queue.

11. The one or more non-transitory computer-accessible storage media of claim 9, wherein the one or more other threads are moved to the secondary queue preserving the order in which they were enqueued in the primary queue.

12. The one or more non-transitory computer-accessible storage media of claim 9, the program instructions that when executed on or across the plurality of processors cause the plurality of processors to further perform:
  determining, by the first thread after gaining control of the lock, to transfer control of the lock to one of the waiting threads, and responsive to the determining:
    moving the respective wait structures of the one or more other threads from the secondary queue to the primary queue; and
    writing to a respective wait structure of the one of the other threads to transfer control of the lock to the one of the waiting threads and promote the one of the waiting threads to a third controlling thread.

13. The one or more non-transitory computer-accessible storage media of claim 12, wherein the first thread and the second thread execute on one of a plurality of processors of a computing system, wherein the one or more other threads execute on another one of the plurality of processors with different memory access characteristics than the processor executing the first controlling thread and the second controlling thread, and wherein moving the respective wait structures of the one or more threads from the secondary queue to the primary queue is performed responsive to determining that no other thread executes on the one of a plurality of processors executing the second thread.

14. The one or more non-transitory computer-accessible storage media of claim 12, wherein moving the respective wait structures of the one or more other threads from the secondary queue to the primary queue comprises inserting the respective wait structures of the one or more other threads at the head of the primary queue to ensure fairness, wherein the respective wait structures of the one or more other threads are linked together preserving the order in which they were enqueued in the primary queue.

15. A system, comprising:
  a plurality of processors and a memory comprising program instructions executable by the plurality of processors to perform an operation to transfer control of a lock, the operation configured to:
    add, by a first thread, a wait structure to a primary queue to wait for allocation of a lock, the wait structure comprising a wait field initialized to a zero value; and
    write, by a second thread, a non-zero value to the wait field of the wait structure to transfer control of the lock to the first thread, the non-zero value comprising an address of a secondary queue comprising one or more other threads waiting for the lock.

16. The system of claim 15, the operation further configured to:
  move, prior to writing the non-zero value to the wait field of the wait structure, respective wait structures of one or more other threads linked in front of the wait structure in the primary queue to a secondary queue.

17. The system of claim 16, wherein the first thread executes on one of a plurality of processors of a computing system also executing the second thread, and wherein the one or more other threads execute on another one of the plurality of processors with different memory access characteristics than the processor executing the first controlling thread, and wherein the respective wait structures of the one or more other threads are linked together to form the secondary queue.

18. The system of claim 16, the operation further configured to:
  determine, by the first thread after gaining control of the lock, to transfer control of the lock to one of the waiting threads, and responsive to the determining:
    move the respective wait structures of the one or more other threads from the secondary queue to the primary queue; and
    write to a respective wait structure of the one of the other threads to transfer control of the lock to the one of the waiting threads and promote the one of the waiting threads to a third controlling thread.

19. The system of claim 18, wherein the first thread and the second thread execute on one of a plurality of processors of a computing system, wherein the one or more other threads execute on another one of the plurality of processors with different memory access characteristics than the processor executing the first controlling thread and the second controlling thread, and wherein moving the respective wait structures of the one or more threads from the secondary queue to the primary queue is performed responsive to determining that no other thread executes on the one of a plurality of processors executing the second thread.

20. The system of claim 18, wherein moving the respective wait structures of the one or more other threads from the secondary queue to the primary queue comprises inserting the respective wait structures of the one or more other threads at the head of the primary queue to ensure fairness, wherein the respective wait structures of the one or more other threads are linked together preserving the order in which they were enqueued in the primary queue.

* * * * *

UNITED STATES PATENT AND TRADEMARK OFFICE
CERTIFICATE OF CORRECTION

| | | |
|---|---|---|
| PATENT NO. | : 12,260,267 B2 | Page 1 of 1 |
| APPLICATION NO. | : 18/052890 | |
| DATED | : March 25, 2025 | |
| INVENTOR(S) | : Kogan et al. | |

It is certified that error appears in the above-identified patent and that said Letters Patent is hereby corrected as shown below:

In the Specification

In Column 1, Line 6, delete "19," and insert -- 17, --, therefor.

In Column 2, Line 23, delete "FIG." and insert -- FIGS. --, therefor.

Signed and Sealed this
Seventeenth Day of June, 2025

Coke Morgan Stewart
*Acting Director of the United States Patent and Trademark Office*